United States Patent Office 3,375,281
Patented Mar. 26, 1968

3,375,281
PROCESS FOR THE PREPARATION OF STEARONE
Edward S. Rothman, Philadelphia, Pa., assignor to the United States of America as represented by the Secretary of Agriculture
No Drawing. Filed May 13, 1966, Ser. No. 549,810
2 Claims. (Cl. 260—595)

A non-exclusive, irrevocable, royalty-free license in the invention herein described, throughout the world for all purposes of the United States Government, with the power to grant sublicenses for such purposes, is hereby granted to the Government of the United States of America.

This invention relates to the prepartion of an alkanone, and has among its objects providing a novel process for the preparation of stearone.

Stearone has been previously prepared commercially by heating stearic acid to 370° C. in iron kettles in the presence of 10% by weight of iron filings. The process of the present invention makes it possible to prepare stearone at markedly lower temperatures, yet with at least double the yield.

According to the present invention stearone is prepared by heating isopropenyl stearate to at least about 180° C. in the presence of a catalytic amount of a proton-providing acid catalyst such as p-toluenesulfonic acid.

Isopropenyl stearate is conveniently prepared by the sulfuric acid catalyzed interchange reaction of stearic acid with commercially available isopropenyl acetate as described in J. Org. Chem., 27, 3123 (1962).

For the production of stearone as the major product of the catalyzed reaction of isopropenyl stearate, it is important that no solvent or diluent agent be included in the reaction medium.

The use of the unsaturated (enol) ester, isopropenyl stearate, is critical to the process, as the saturated ester, isopropyl stearate, is inoperative to produce stearone when substituted for the isopropenyl stearate.

While the temperature at which the isopropenyl stearate is converted to stearone occurs over a considerable range of temperature, for practical purpose a temperature of at least 180° C., preferably in the range of 200°±20° C., is used so that the reaction is substantially complete in less than an hour.

The proton-providing catalyst is typically of the sulfonic acid type, with p-toluenesulfonic acid being preferred because of its high boiling point.

The following example is illustrative of the process of the present invention, but is not intended to be in limitation thereof.

EXAMPLE 1

Isopropenyl stearate and 0.5 weight percent of p-toluenesulfonic acid was heated to 185–200° C. for forty minutes. The melt was allowed to cool. Upon dilution with hexane, rhombic plates of stearone, very insoluble in hexane, separated.

The stearone, M.P. 80° C. was characterized as the ketoxime, M.P. 69.2–70.0° C.

Stearone has many recorded uses as an intermediate, such as for preparation of barium derivatives for use in lubricants. Stearone is also useful, per se, as in stabilization of hectograph ink compositions.

I claim:
1. A process for the preparation of stearone consisting of heating isopropenyl stearate at a temperature of at least 180° C. in the presence of at least a catalytic amount of a proton-providing acid catalyst.
2. The process of claim 1 in which the proton-providing acid catalyst is p-toluenesulfonic acid.

References Cited

Young et al., J. Am. Chem. Soc., vol. 72, pp. 3635 to 3642 (1950).

LEON ZITVER, *Primary Examiner.*

M. JACOB, *Assistant Examiner.*